June 24, 1930.  H. L. JOHNSTON ET AL  1,767,002
FOOD HANDLING APPARATUS
Filed Jan. 7, 1929  2 Sheets-Sheet 2
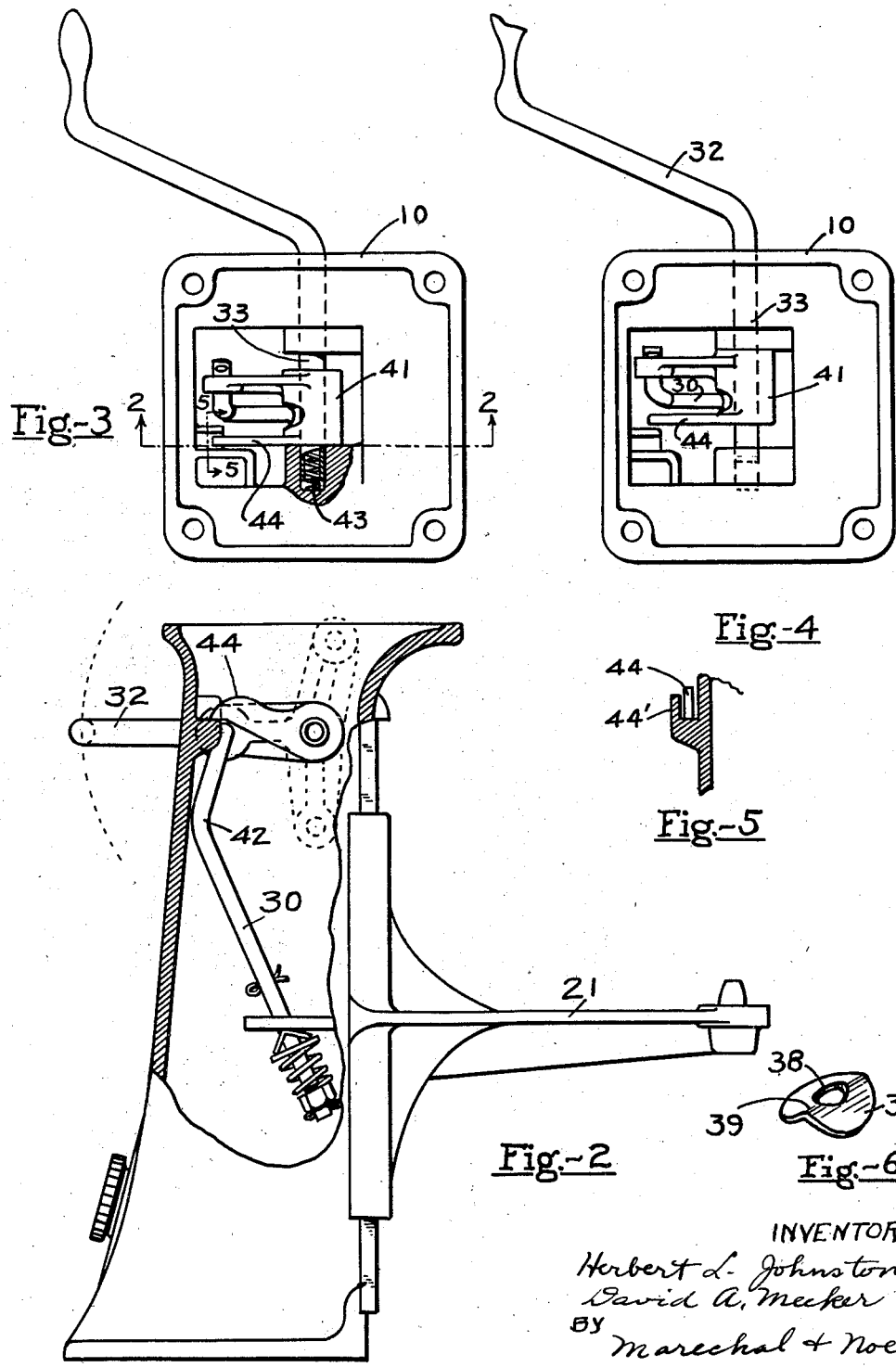
INVENTORS
Herbert L. Johnston
David A. Meeker
BY Marechal + Noe
ATTORNEYS Patented June 24, 1930

1,767,002

UNITED STATES PATENT OFFICE

HERBERT L. JOHNSTON AND DAVID A. MEEKER, OF TROY, OHIO, ASSIGNORS, BY MESNE ASSIGNMENTS, TO THE KITCHEN AID MANUFACTURING COMPANY, OF TROY, OHIO, A CORPORATION OF OHIO

FOOD-HANDLING APPARATUS

Original application filed May 14, 1928, Serial No. 277,616. Divided and this application filed January 7, 1929. Serial No. 330,837.

This invention relates to apparatus for handling or mixing foodstuffs or other material.

One object of the invention is the provision of an apparatus of this character having a bowl which may be raised or lowered, in which a simple mechanism is provided for raising and maintaining the bowl in its raised position in cooperative association with the food-treating member.

Other objects and advantages of the invention will be apparent from the following description and from the accompanying drawings in which, Fig. 1 is a side elevation of a mixing machine embodying the present invention, part of the pedestal being broken away;

Fig. 2 is a side elevation of the pedestal, shown partly in section, with the bowl support in a mid-position;

Fig. 3 is a top plan view of the pedestal shown in Fig. 2;

Fig. 4 is a top plan view of the pedestal with the handle in free or released position;

Fig. 5 is a vertical section through the mid-position stop of the bowl support on the line 5—5 of Fig. 3; and Fig. 6 is a detail of a part of the bowl raising mechanism.

Figure 1:
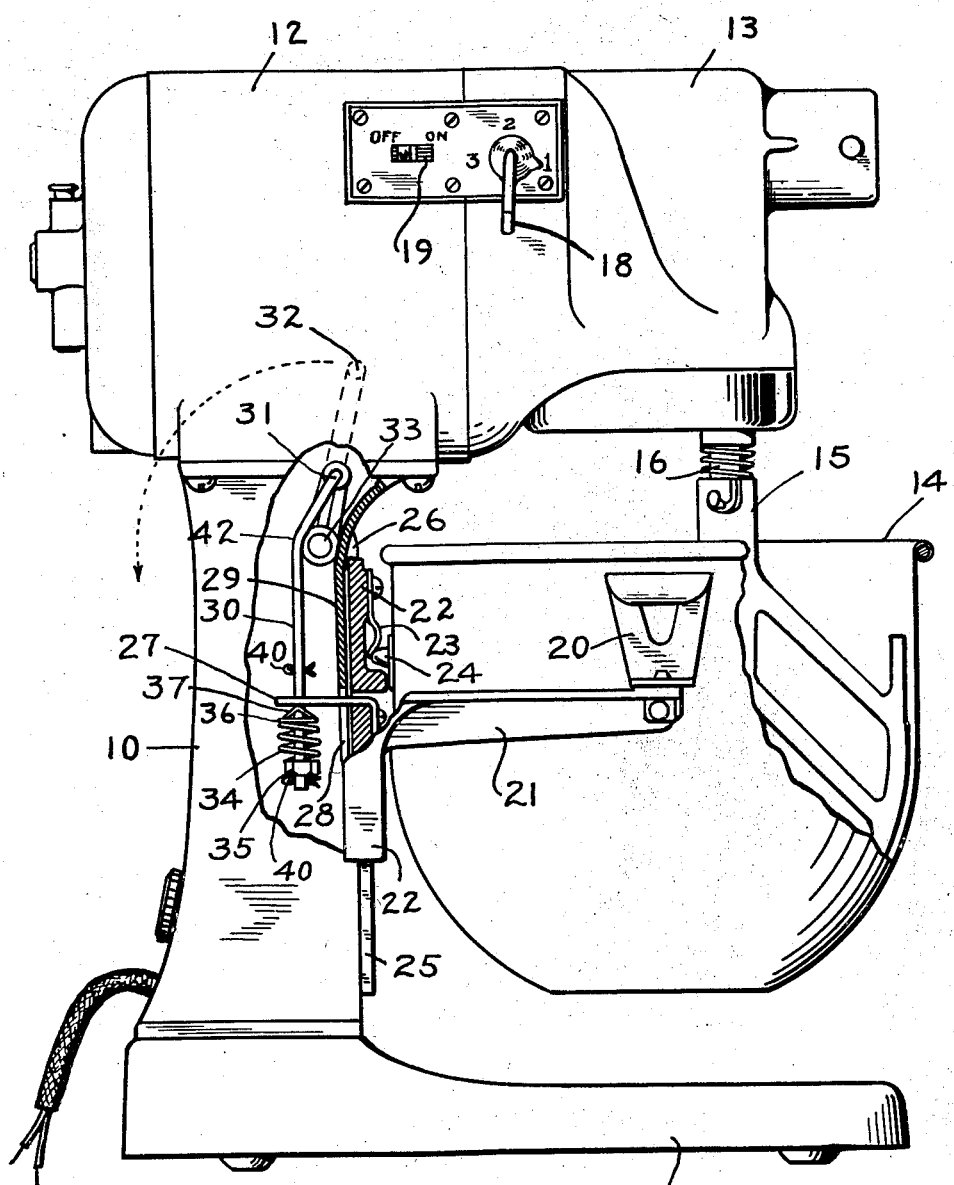

Referring more particularly to the drawings, Fig. 1 shows a mixing machine adapted for stirring, beating, mixing or otherwise handing foodstuffs, dough or other material, the machine shown being of the type especially adapted to be used in the household. As shown, the machine comprises an upright standard 10 supported by the base 11 and in turn supporting an electric motor 12, a gear-changing and speed-reducing housing 13 and a mixing bowl 14. The gear housing 13 is approximately coextensive in its lateral and vertical dimensions with the motor housing to which it is attached and by which it is supported. The mixing bowl cooperates with a beater arm 15 which is operated from a shaft 16 driven from the motor through the gear-changing device mentioned. A control handle 18 is adapted to be manually operated to select the proper speed for suitable operation of the beater arm 15, and an electric control switch 19 is provided to control the starting and stopping of the motor 12.

This case is particularly concerned with the operating mechanism by means of which the mixing bowl is raised and lowered, and held in its desired position, this case being a division of our prior application for Letters Patent entitled Food-handling apparatus Serial No. 277,616 filed May 14, 1928. As disclosed in that application, the raising and lowering of the mixing bowl is effected by a simple mechanism which may be easily operated and which maintains the bowl in a raised position without requiring the operation of locking pawls or similar operable locking devices. The mixing bowl 14 is provided with side brackets 20 which are seated upon the ends of supporting arms 21 provided on a bowl support 22 so that they extend along opposite sides of the bowl and assume the entire weight of the bowl and its contents. The bowl support 22 is preferably provided with a spring 23 which is engaged by a small nose 24 provided on the rear of the bowl, to hold the bowl firmly on the support and prevent it from tilting during the operation of the beater arm.

The bowl support 22 is adapted to move up and down along the standard 10 which is provided with a slide guide 25 for this purpose the opposite side edges of which guide the movements of the support 22. When the bowl is in its raised position the top of the bowl support 22 engages a pair of laterally spaced stop lugs 26 provided in the standard so that the upper limit of movement of the bowl is thus definitely determined. Rigid with the bowl support 22 is an arm 27 which extends rearwardly through a vertical slot 28 in the forward wall 29 of the standard. This arm 27 is provided with an opening through which a link 30 extends, this link being pivotally connected at 31 to a control or lift handle 32 which is pivoted on the standard at 33. The link 30 as previously mentioned extends through an opening in the rigid arm 27, where the link and the arm are operably connected together by means of a spring 34 which bears at one end against a nut 35 provided on the bottom end of the link, the top of the spring pressing against a pressure plate 36 on which rests a bent thrust member 37. This thrust member as shown in Fig. 6 is provided with a central hole 38 through which the link 30 extends, and the ridge 39 on this bent thrust member engages the rigid arm 27 so that the weight of the bowl acting on this arm is transmitted through the spring to the link 30. Cotter-pins 40 in the link 30 are provided below the nut 35 and above the arm 27 as shown. When the lever 32 is in the position shown in Fig. 1 the bowl-raising link 30 and lever 32 constitute in effect a closed toggle the weight of the bowl or the bowl and its contents being transmitted through the arm 27 and link 30 to the control lever in such a way as to tend to maintain the control lever in bowl-raised position as shown in this figure. This is due to the fact that the axis 33 of the control lever is somewhat out of alignment with the points of connection of the link 30 and with the control lever and with the arm 27, the axis 33 as shown in Fig. 1 being slightly to the left of the line through these points, and the link 30 being bent at the point 42 for this purpose. When the lever is in bowl-raised position, as shown, the spring 34 is compressed between the nut 35 and the arm 27, the upper limit of movement of the arm 27 being limited by the stops 26 which are so positioned that the spring 34 will be compressed when the bowl is in its uppermost position and in cooperative association with the beater arm 15. When the control handle 32 is rotated in a counter-clockwise direction as shown by the dotted arrow in Fig. 1 the initial movement will cause a further compression of the spring 34 since the arm 27 cannot move upwardly from the position shown. Then after the points 31, 33 and 39 are aligned, further lowering movement of the control handle will permit the bowl support to be lowered, and the lowermost position of the bowl may be defined by the realignment of the points 31, 33 and 39 when the control handle extends downwardly from its pivotal support. It will thus be understood that the removal of the bowl 14 may be easily effected and that the bowl may be very easily adjusted or moved into its elevated position in cooperative relation with the beater arm. Furthermore the construction is such that the bowl support is locked firmly yet yieldingly against the stops in its upper position by the action of the spring 34 so that vibration and rattle of the bowl support will not take place. The bowl being held firmly yet yieldingly on the bowl support permits no noise and rattle to occur between those parts and the bowl support just described eliminates noise and rattle between the support and the standard, the result being a perfectly quiet arrangement yet one which permits variations in the bowl height and its quick removal from the machine.

The bowl-raising mechanism also has provisions for holding the bowl in a partly raised or mid-position. As shown in Figs. 2, 3 and 4 the control handle shaft 33 has mounted in fixed position thereon, a block 41 located between the bearings in the sides of the standard and shorter in extent than the distance across these bearings to permit some endwise movement of the shaft 33. The shaft 33 and the control handle are normally pressed outwardly to the position indicated in Fig. 4 by a spring 43 bearing against the hollow end of the shaft and against the standard side, and in this position the block 41 rotates with the shaft without any effect on the mechanism. However when the handle is pressed in towards the standard after the bowl has been partly raised, a tongue 44 on the block 41 is brought over a socket stop 44' and if the handle is then lowered some little distance the tongue will be retained in the socket stop and the bowl held partly raised or in a mid-position. To lower the bowl from this mid-position it is merely necessary to move the handle angularly in the direction for raising the bowl and after a small angular motion of the handle the tongue will be freed from the socket and the spring 43 moves the handle and its shaft outwardly. The bowl is therefore very easily adjusted and is held either in raised or lowered position or in a mid-position, by the proper operation of the single control handle.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a machine of the class described, a frame, a bowl, means for raising and lowering the bowl along the frame, a device for holding the bowl in position between its upper and lower limits of movements, said device being releasable by operation of said means.

2. In a machine of the class described, a frame, a bowl, a lever for raising or lowering the bowl along the frame, a device for holding the bowl in position between its upper and lower limits of movement, said device being released automatically by raising movements of said lever.

3. In a machine of the class described, a frame, a bowl, and means for raising and lowering the bowl along the frame comprising a lever pivoted to the frame, a connection between the lever and the bowl, a stop for limiting upward movement of the bowl and resilient means adapted to function when the lever is in bowl-raised position for firmly holding the bowl in raised position.

4. In a machine of the class described, a frame, a bowl, and means for raising and lowering the bowl along the frame, comprising a lever pivoted to the frame, a connection between the lever and the bowl such that the weight of the bowl tends to hold the lever in its bowl-raised position, a stop for limiting upward movement of the bowl and resilient means in said connection adapted to function when the lever is in bowl-raised position for yieldingly maintaining the bowl in its raised position.

5. In a machine of the class described, a frame, a bowl, a bowl support, resilient means acting between said bowl and said bowl support for firmly holding said bowl to said bowl support, means for adjusting said bowl support on said frame, and yielding means acting between said bowl support and said frame for holding said bowl support against looseness on said frame.

6. In a machine of the class described, a frame, a bowl, a bowl support slidably mounted for up and down movement on said frame, and means for raising and lowering the bowl support comprising a lever pivoted to the frame, a link pivoted to said lever and connected to said bowl support, the pivotal axis of said lever being slightly out of alignment with and located between the pivotal connection of the lever and link and the connection between the link and the bowl support so that the weight of the bowl tends to hold the lever in its bowl-raised position, and yielding means adapted to function when the lever is in bowl-raised position for yieldingly resisting initial movement of the lever from bowl-raised position.

7. In a machine of the class described, a frame, a bowl, a bowl support slidably mounted for up and down movement on said frame, and means for raising and lowering the bowl support comprising a lever pivoted to the frame, a link pivoted to said lever and connected to said bowl support, the pivotal axis of said lever being slightly out of alignment with and located between the pivotal connection of the lever and link and the connection between the link and the bowl support so that the weight of the bowl tends to hold the lever in its bowl-raised position, a stop for definitely limiting upward movement of the bowl support, and a spring associated with said link and adapted to be compressed when the lever is in bowl-raised position for yieldingly maintaining the bowl support against the stop.

8. In a machine of the class described, a frame, bowl mechanism movably mounted on said frame, means for raising and lowering said bowl mechanism along said frame, a stop for limiting upward movement of said bowl mechanism along said frame, and resilient means for holding said bowl mechanism in raised position against said stop.

9. In a machine of the class described, a frame, bowl mechanism movably mounted on said frame, means for raising and lowering said bowl mechanism along said frame, and resilient means effective between said bowl mechanism and said frame in raised position of said bowl mechanism for resiliently holding said bowl mechanism against looseness on said frame.

10. In a machine of the class described, a frame, a bowl support movably mounted thereon, a bowl carried by said bowl support, means for raising and lowering said bowl support along said frame, and spring means acting between said bowl support and said frame in raised position of said bowl support for resiliently holding said bowl support against looseness on said frame.

11. In a machine of the class described, a frame, bowl mechanism movably mounted on said frame, means for raising and lowering said bowl mechanism along said frame, a fixed stop in predetermined position for positively limiting the upper position of said bowl mechanism, and resilient means for securely holding said bowl mechanism in upper position against said stop.

12. In a machine of the class described, a frame, a bowl support movably mounted on said frame, a bowl carried thereby, means for raising and lowering said bowl support along said frame, a stop carried by said frame in predetermined position to contact with said bowl support to limit the upper position thereof, and spring means acting between said bowl support and said frame for securely holding said bowl support in said upper position against said stop.

13. In a machine of the class described, a frame, a bowl support movably mounted on said frame, a bowl carried thereby, a lifting mechanism for raising and lowering said bowl support on said frame, a fixed stop in predetermined position for limiting the upward movement of said bowl support on said frame, said lifting mechanism being adapted to move on elevating movement of the bowl support to a position beyond that which brings said bowl support into engagement with said stop, and resilient means effective between said bowl support and said frame to permit said further movement of said lifting mechanism and for holding said bowl support securely against said stop upon such further movement of the lifting mechanism.

14. In a machine of the class described, a frame, a bowl support movably mounted on said frame, a bowl carried thereby, means for raising and lowering said bowl support on said frame including toggle linkage, a fixed stop in predetermined position for limiting the upward movement of said bowl support on said frame, said toggle linkage being adapted upon elevating movement of the bowl support to bring said bowl support into contact with said stop and then move further across center position of the toggle mechanism, whereby the weight of said bowl serves to hold said toggle mechanism in raised position, and resilient means effective between said bowl support and said frame permitting such further movement of said toggle linkage without movement of said bowl support and holding said bowl support securely against said stop upon such further movement of said toggle linkage.

15. In a machine of the class described, a frame, a bowl support movably mounted on said frame, a bowl carried thereby, toggle mechanism acting between said frame and said bowl support for raising and lowering said bowl support on said frame including a pivoted operating lever, a link connected to said lever for rocking movement therewith, and a second link pivotally connected to said first mentioned link, said linkage being adapted to straighten out to bring said links into alignment upon elevating movement of said bowl support and to then move past said aligned position, a fixed stop in predetermined position for positively limiting the upward movement of said bowl support on said frame, said stop being adapted to engage said bowl support upon elevating movement thereof prior to the time said linkage has assumed aligned positioning of the links thereof, and resilient means effective between said bowl support and said frame for permitting further aligning movement of said links after said bowl support has engaged said stop, said resilient means serving to hold said bowl support in upper position against said stop upon further movement of said links beyond aligned position.

16. In a machine of the class described, a frame, a bowl support movably mounted on said frame, a bowl carried thereby, means for raising and lowering said bowl support on said frame including a toggle mechanism acting between said bowl support and said frame, a fixed stop in predetermined position for limiting the upward movement of said bowl support on said frame, said toggle mechanism being adapted upon elevating movement of the bowl support to bring said bowl support into contact with said stop and then move farther across center position of the toggle mechanism, and resilient means in said toggle mechanism effective between said bowl support and said frame, said resilient means being adapted to be compressed upon the straightening out movement of said toggle mechanism as it moves across center, such that when said toggle mechanism moves to its ultimate position past center sufficient compression remains in said resilient means to securely hold said bowl support in upper position against said stop.

17. In a machine of the class described, a frame, bowl mechanism movably mounted on said frame, lifting means for raising and lowering said bowl mechanism along said frame, a stop in predetermined position for limiting the upward movement of said bowl mechanism along said frame, and an interconnection between said bowl mechanism and said lifting means so arranged that the line of action of the lifting force of said interconnection is offset rearwardly with relation to said stop, whereby the lifting force produces an upward force component holding the upper portion of said bowl mechanism securely against said stop, and also a force component tending to rotate said bowl mechanism about the lower portion thereof as a pivot to securely hold said lower portion of the bowl mechanism against said frame.

18. In a machine of the class described, a frame, a bowl support movably mounted on said frame, a bowl carried thereby, lifting means for raising and lowering said bowl support along said frame, a stop in predetermined position for limiting the upward movement of said bowl support along said frame, a rearwardly extending member carried by said bowl support, and an interconnection between said rearwardly extending member and said lifting means such that the line of action of the lifting force of said interconnection is offset rearwardly of said stop, whereby said lifting force produces an upward force component holding the upper portion of said bowl support securely against said stop, and also a force component tending to rotate said bowl support about the lower portion thereof as a pivot to securely hold the lower portion of the bowl support against said frame.

In testimony whereof we hereto affix our signatures.

HERBERT L. JOHNSTON.
DAVID A. MEEKER.